(12) United States Patent
Rosenlund et al.

(10) Patent No.: US 10,752,487 B2
(45) Date of Patent: Aug. 25, 2020

(54) OBJECT DETECTION FOR EQUIPMENT CONTROL

(71) Applicant: Control Products, Inc., Chanhassen, MN (US)

(72) Inventors: Richard S. Rosenlund, Minnetrista, MN (US); Robert Joseph Kuechenmeister, Lester Prairie, MN (US); Michael Borntrager, Chaska, MN (US); Gary Olson, Belle Plaine, MN (US); Timothy Wolf, Le Center, MN (US)

(73) Assignee: Control Products, Inc., Chanhassen, MN (US)

( * ) Notice: Subject to any disclaimer, the term of this patent is extended or adjusted under 35 U.S.C. 154(b) by 0 days.

(21) Appl. No.: 16/046,315

(22) Filed: Jul. 26, 2018

(65) Prior Publication Data

US 2018/0334375 A1 Nov. 22, 2018

Related U.S. Application Data

(63) Continuation of application No. 15/158,322, filed on May 18, 2016, now Pat. No. 10,053,354.

(Continued)

(51) Int. Cl.
*B67D 1/08* (2006.01)
*G01S 17/10* (2020.01)
(Continued)

(52) U.S. Cl.
CPC ......... *B67D 1/0882* (2013.01); *B67D 1/0081* (2013.01); *B67D 1/0888* (2013.01);
(Continued)

(58) Field of Classification Search
CPC .... B67D 1/0882; B67D 1/124; B67D 1/0081; B67D 1/0888; B67D 1/0894;
(Continued)

(56) References Cited

U.S. PATENT DOCUMENTS

| | | | |
|---|---|---|---|
| 5,868,311 A | 2/1999 | Cretu-Petra | |
| 8,109,301 B1 * | 2/2012 | Denise | F25D 23/126 141/360 |

(Continued)

FOREIGN PATENT DOCUMENTS

| | | |
|---|---|---|
| CN | 203489972 U | 3/2014 |
| KR | 1997037626 | 7/1997 |
| WO | WO-2014208834 A1 | 12/2014 |

OTHER PUBLICATIONS

Office Action regarding Chinese Patent Application No. 2016800348604, dated Jan. 16, 2019. Translation provided by Unitalen Attorneys at Law.

(Continued)

*Primary Examiner* — Donnell A Long
(74) *Attorney, Agent, or Firm* — Harness, Dickey & Pierce, P.L.C.

(57) ABSTRACT

A system and method are provided and include an infrared emitter that emits a predetermined pattern of pulses of infrared light and an infrared receiver that detects the predetermined pattern of pulses of infrared light after the predetermined pattern of pulses of infrared light reflect off of a container. A proximity detection module is configured to determine a transmission time when the infrared emitter emits the predetermined pattern of pulses of infrared light, a detection time when the infrared receiver detects the predetermined pattern of pulses of infrared light, an elapsed time between the transmission time and the detection time, and a distance to the container based on the elapsed time. A control module for a dispenser is configured to receive the (Continued)

determined distance from the proximity detection module and to activate the dispenser when the determined distance to the container is less than a predetermined threshold.

20 Claims, 11 Drawing Sheets

Related U.S. Application Data

(60) Provisional application No. 62/180,659, filed on Jun. 17, 2015.

(51) Int. Cl.
<br>    *G01S 7/481*       (2006.01)
<br>    *F25C 5/20*        (2018.01)
<br>    *B67D 1/00*       (2006.01)
<br>    *B67D 1/12*       (2006.01)

(52) U.S. Cl.
<br>    CPC ........... *B67D 1/0894* (2013.01); *B67D 1/124* (2013.01); *F25C 5/20* (2018.01); *G01S 7/4813* (2013.01); *G01S 17/10* (2013.01); *B67D 2001/009* (2013.01); *B67D 2210/00089* (2013.01); *F25C 5/22* (2018.01); *F25D 2700/06* (2013.01)

(58) Field of Classification Search
<br>    CPC .... B67D 2001/009; B67D 2210/00089; F25C 5/20; F25C 5/22; G01S 7/4813; G01S 17/10; F25D 2700/06
<br>    See application file for complete search history.

(56) References Cited

U.S. PATENT DOCUMENTS

| | | | |
|---|---|---|---|
| 2007/0272019 A1 | 11/2007 | Agam et al. | |
| 2008/0105331 A1* | 5/2008 | You | B67D 1/0871 141/198 |
| 2010/0005903 A1* | 1/2010 | Beavis | B67D 1/0036 73/861.47 |
| 2010/0236660 A1 | 9/2010 | Ozanne et al. | |
| 2011/0023511 A1* | 2/2011 | Lee | B67D 1/0857 62/178 |
| 2011/0297832 A1 | 12/2011 | Yao et al. | |
| 2013/0228250 A1 | 9/2013 | Agam et al. | |
| 2014/0014824 A1 | 1/2014 | Huang et al. | |
| 2014/0261879 A1 | 9/2014 | Baack | |
| 2015/0268342 A1 | 9/2015 | Iott et al. | |
| 2015/0305548 A1* | 10/2015 | Girault | G06K 7/1421 426/231 |
| 2015/0315008 A1* | 11/2015 | Locke | B67D 1/1279 222/52 |
| 2016/0122173 A1 | 5/2016 | Ka et al. | |
| 2016/0161328 A1 | 6/2016 | Shen et al. | |
| 2016/0259056 A1 | 9/2016 | Heng et al. | |
| 2018/0312387 A1* | 11/2018 | Choi | B67D 1/1238 |

OTHER PUBLICATIONS

International Search Report regarding International Application No. PCT/US2016/033338, dated Sep. 1, 2016.

Written Opinion of the International Searching Authority regarding International Application No. PCT/US2016/033338, dated Sep. 1, 2016.

Restriction Requirement regarding U.S. Appl. No. 15/158,322, dated Jun. 1, 2017.

Office Action regarding U.S. Appl. No. 15/158,322, dated Oct. 30, 2017.

Notice of Allowance and Fee(s) Due regarding U.S. Appl. No. 15/158,322, dated Apr. 19, 2018.

Extended European Search Report regarding European Patent Application No. PCT/US2016/033338, dated Nov. 27, 2018.

Second Office Action regarding Chinese Patent Application No. 201680034860.4, dated Aug. 26, 2019. Translation provided by Unitalen Attorneys at Law.

* cited by examiner

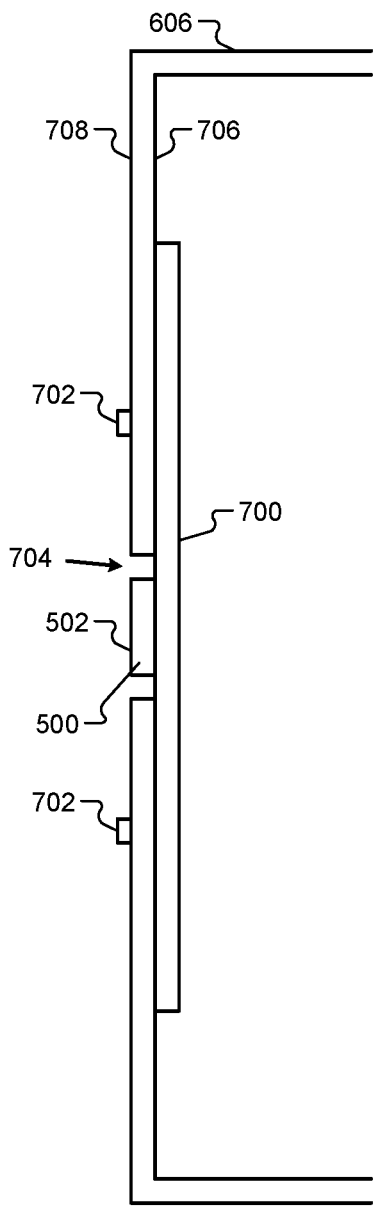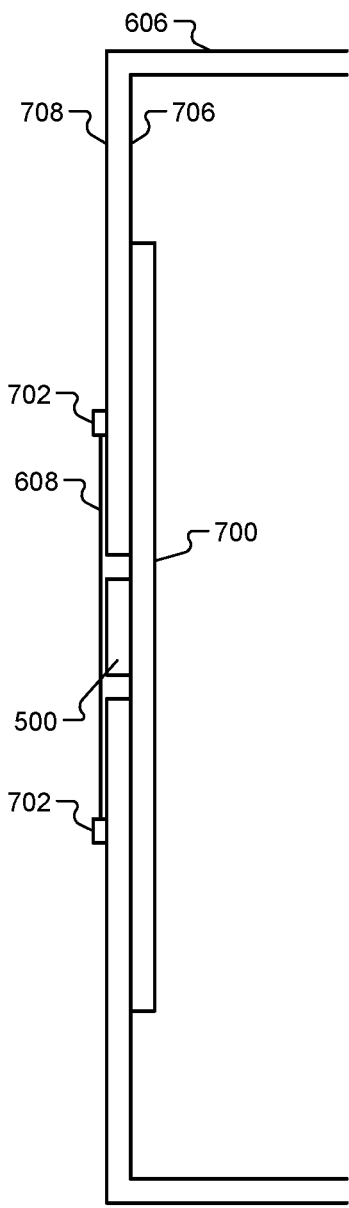
Fig. 7A
Fig. 7B

OBJECT DETECTION FOR EQUIPMENT CONTROL

CROSS-REFERENCE TO RELATED APPLICATIONS

This application is a continuation of U.S. application Ser. No. 15/158,322, filed May 18, 2016, which claims the benefit of U.S. Provisional Application No. 62/180,659, filed on Jun. 17, 2015. The entire disclosures of the above applications are incorporated herein by reference.

FIELD

The present disclosure relates to systems and methods of object detection for equipment control and, more specifically, to systems and methods for object detection that determine the proximity of an object based on a measured time for emitted light to travel to an object and reflect back to a sensor and that control equipment based on the determined proximity.

BACKGROUND

This section provides background information related to the present disclosure which is not necessarily prior art.

Equipment control systems may include touchless object detections systems that determine the proximity of an object and control equipment based on the proximity. For example, a dispensing machine, such as a beverage or ice dispensing machine, may include a touchless object detection system that determines the proximity of a container to a dispensing apparatus. When the container is in close proximity to the dispensing apparatus, the dispensing machine may initiate dispensing into the container.

Such a touchless object detection system may include an infrared (IR) emitter and an IR receiver. For example, the IR emitter may emit pulses of IR light that reflect off of the object, such as the container, and back to the IR receiver. The touchless detection system may measure an intensity of the reflected IR pulses and determine the proximity of the object based on the measured intensity of the reflected light. For example, the measured intensity of the reflected light is generally greater for an object that is closer than it is for an object that is farther away, provided the two objects have the same or similar color and/or level of transparency. The intensity of the reflected light is dependent, however, on the color and/or transparency of the object in addition to the distance of the object to the sensor. For example, the intensity of light reflected off of a relatively transparent object, such as a transparent container, is generally less than the intensity of light reflected off of an opaque object, such as an opaque container, at the same distance from the sensor. For this reason, object detection systems that determine proximity based on the measured intensity of light reflected off of the object can have difficulty accurately determining the proximity of objects of different colors and levels of transparency.

Touchless object detection systems may also utilize ultra-sonic distance sensors to determine the presence of an object. Such systems, however, often have a minimum detection range that is greater than the desired object proximity for a particular system, such as a beverage or ice dispensing system. As such, object detection systems utilizing ultra-sonic distance sensors may not be suitable for detection of objects in close proximity to the sensor.

SUMMARY

This section provides a general summary of the disclosure, and is not a comprehensive disclosure of its full scope or all of its features.

In various embodiments of the present disclosure, a system is provided and includes a sensor module having an infrared emitter that emits infrared light and an infrared receiver that detects the infrared light emitted by the infrared emitter and reflected off of a container. The sensor module determines a time period between emission of the infrared light by the infrared emitter and detection of the infrared light by the infrared receiver and determining a distance to the container based on the determined time period. The system also includes a control module for a dispenser. The control module is configured to receive the determined distance from the sensor module, activate the dispenser when the determined distance to the container is less than the predetermined threshold, and deactivate the dispenser when the determined distance to the container is greater than the predetermined threshold.

In other features, the control module is configured to activate the dispenser when the determined distance to the container is less than the predetermined threshold minus a predetermined hysteresis value and to deactivate the dispenser when the determined distance to the container is greater than the predetermined threshold plus the hysteresis value.

In other features, the dispenser dispenses at least one of liquid and ice into the container when activated.

In other features, the system includes a housing with an aperture, wherein the sensor module is included in a sensor module casing and wherein the sensor module casing is installed within the housing such that the infrared emitter emits the infrared light through the aperture and the infrared receiver detects the infrared light through the aperture.

In other features, an outer face of the sensor module casing is flush with an outer face of the housing, the system further comprising a protective overlay positioned over the outer face of the sensor module casing and at least a portion of the outer face of the housing.

In other features, the protective overlay is positioned flat against the outer face of the sensor module casing.

In other features, the system includes a housing and a printed circuit board, wherein the sensor module is included in a sensor module casing mounted to the printed circuit board and the printed circuit board is mounted to the housing such that the infrared emitter emits the infrared light through an aperture of the housing and the infrared receiver detects the infrared light through the aperture.

In other features, an outer face of the sensor module casing is flush with an outer face of the housing, the system further comprising a protective overlay positioned over the outer face of the sensor module casing and at least a portion of the outer face of the housing such that the protective overlay is flat against the outer face of the sensor module casing.

In other features, the system includes a housing, a primary printed circuit board, and a secondary printed circuit board, wherein the sensor module is included in a sensor module casing mounted to the secondary printed circuit board, the secondary printed circuit board is mounted to the primary printed circuit board, and the primary printed circuit board is mounted to the housing such that the infrared emitter emits the infrared light through an aperture of the housing and the infrared receiver detects the infrared light through the aperture.

In other features, an outer face of the sensor module casing is flush with an outer face of the housing, the system further comprising a protective overlay positioned over the outer face of the sensor module casing and at least a portion of the outer face of the housing such that the protective overlay is flat against the outer face of the sensor module casing.

In other features, the system includes an adhesive gasket adhering the primary circuit board to the housing, the adhesive gasket being positioned to prevent potting material from contacting the secondary circuit board and the sensor module casing when the housing is potted.

In various embodiments of the present disclosure, a method is provided and includes emitting, with an infrared emitter of a sensor module, infrared light towards a container. The method also includes detecting, with an infrared receiver of the sensor module, the infrared light emitted by the infrared emitter and reflected off of a container. The method also includes determining, with the sensor module, a time period between emission of the infrared light by the infrared emitter and detection of the infrared light by the infrared receiver. The method also includes determining, with the sensor module, a distance to the container based on the determined time period. The method also includes receiving, with a control module for a dispenser, the determined distance from the sensor module. The method also includes activating, with the control module, the dispenser when the determined distance to the container is less than the predetermined threshold and deactivating, with the control module, the dispenser when the determined distance to the container is greater than the predetermined threshold.

In other features, the control module activates the dispenser when the determined distance to the container is less than the predetermined threshold minus a predetermined hysteresis value and deactivates the dispenser when the determined distance to the container is greater than the predetermined threshold plus the predetermined hysteresis value.

In other features, the dispenser, when activated, dispenses at least one of liquid and ice into the container.

In other features, the sensor module is included in a sensor module casing and wherein the sensor module casing is installed within a housing having an aperture, such that the infrared emitter emits the infrared light through the aperture and the infrared receiver detects the infrared light through the aperture.

In other features, an outer face of the sensor module casing is flush with an outer face of the housing, and wherein a protective overlay is positioned over the outer face of the sensor module casing and at least a portion of the outer face of the housing.

In other features, the protective overlay is positioned flat against the outer face of the sensor module casing.

In other features, the sensor module is included in a sensor module casing mounted to a printed circuit board and wherein the printed circuit board is mounted to a housing having an aperture such that the infrared emitter emits the infrared light through the aperture and the infrared receiver detects the infrared light through the aperture.

In other features, an outer face of the sensor module casing is flush with an outer face of the housing, and wherein a protective overlay is positioned over the outer face of the sensor module casing and at least a portion of the outer face of the housing such that the protective overlay is flat against the outer face of the sensor module casing.

In other features, the sensor module is included in a sensor module casing mounted to a secondary printed circuit board mounted to a primary printed circuit board, and wherein the primary printed circuit board is mounted to a housing having an aperture such that the infrared emitter emits the infrared light through the aperture and the infrared receiver detects the infrared light through the aperture.

In other features, an outer face of the sensor module casing is flush with an outer face of the housing, and wherein a protective overlay is positioned over the outer face of the sensor module casing and at least a portion of the outer face of the housing such that the protective overlay is flat against the outer face of the sensor module casing.

In other features, an adhesive gasket adheres the primary circuit board to the housing, the adhesive gasket being positioned to prevent potting material from contacting the secondary circuit board and the sensor module casing when the housing is potted.

In various embodiments of the present disclosure, a system is provided and includes a sensor module, a control module for an equipment component, a housing with an aperture, a sensor module casing including the sensor module, and a protective overlay. The sensor module has an infrared emitter that emits infrared light and an infrared receiver that detects the infrared light emitted by the infrared emitter and reflected off of an object. The sensor module determines a time period between emission of the infrared light by the infrared emitter and detection of the infrared light by the infrared receiver and determines a distance to the object based on the determined time period. The control module is configured to receive the determined distance from the sensor module, and control the equipment component based on the determined distance to the object. The sensor module casing is installed within the housing such that the infrared emitter emits the infrared light through the aperture and the infrared receiver detects the infrared light through the aperture. An outer face of the sensor module casing is flush with an outer face of the housing. The protective overlay is positioned over the outer face of the sensor module casing and at least a portion of the outer face of the housing.

In other features, the protective overlay is positioned flat against the outer face of the sensor module casing.

In other features, the system includes a printed circuit board, wherein the sensor module casing is mounted to the printed circuit board and the printed circuit board is mounted to the housing.

In other features, they system includes a secondary printed circuit board, wherein the sensor module casing is mounted to the secondary printed circuit board, the secondary printed circuit board is mounted to the primary printed circuit board, and the primary printed circuit board is mounted to the housing.

In other features, the system includes an adhesive gasket adhering the primary circuit board to the housing, the adhesive gasket being positioned to prevent potting material from contacting the secondary circuit board and the sensor module casing when the housing is potted.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7A is a cross section of a housing and sensor module casing.

FIG. 7B is a cross section of a housing and sensor module casing.

Corresponding reference numerals indicate corresponding parts throughout the several views of the drawings.

DETAILED DESCRIPTION

Figure 1:
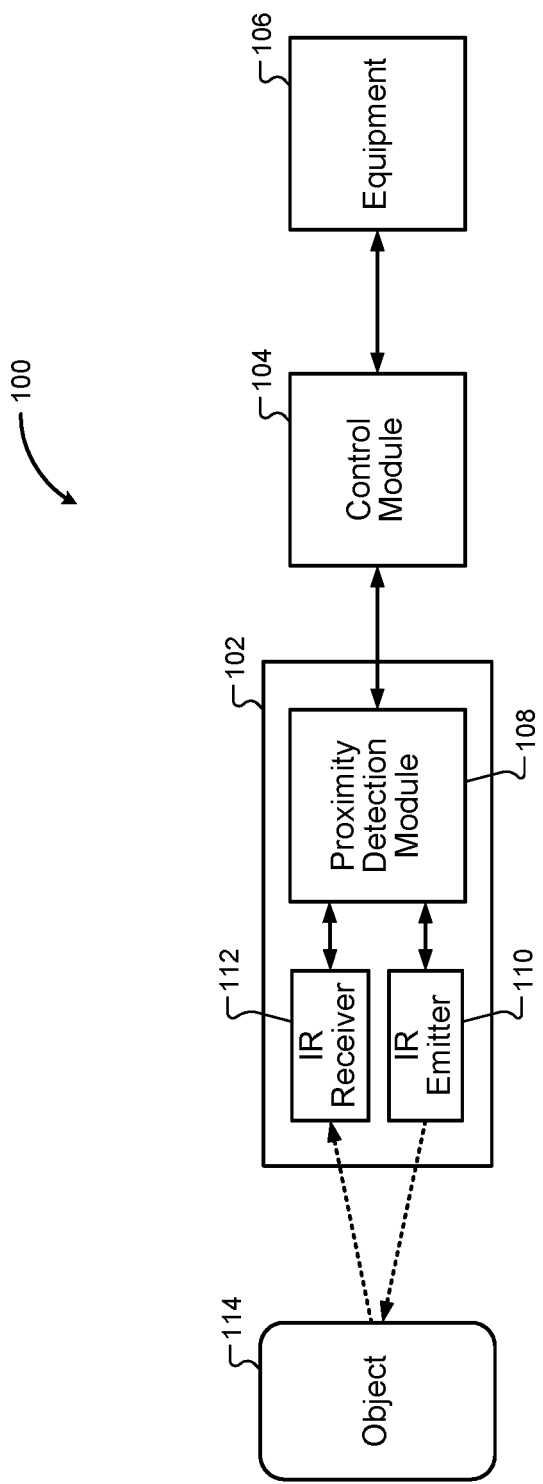
FIG. 1 is a block diagram of an example object detection and equipment control system.

Example embodiments will now be described more fully with reference to the accompanying drawings.

The present disclosure includes systems and methods for object detection and equipment control. Specifically, the present disclosure includes a sensor module with an IR emitter that emits IR pulse(s) towards an object and an IR receiver that receives the IR pulses reflected off of the object. The sensor module determines the elapsed time between the emission of the IR pulse(s) by the IR emitter and the detection of the reflected IR pulse(s) by the IR receiver. The sensor module then determines a distance to the object based on the measured time and the speed of light.

Because the distance is determined based on the time that it takes for the light to travel from the IR emitter and back to the IR receiver after reflecting off of the object, and not the intensity of the reflected light, the systems and methods of the present disclosure are able to accurately determine the distance to an object regardless of the color and/or transparency of the object. In other words, because the intensity of the reflected light does not impact the time and distance calculations, the systems and methods of the present disclosure can be used to accurately calculate distance for both an opaque object that reflects light at a relatively higher intensity as well as a more transparent object that reflects light at a relatively lower intensity. For example, in a beverage dispensing application, the systems and methods of the present disclosure can be used to accurately sense proximity of a container, such as a cup or bottle, regardless of whether the container is opaque or clear plastic or glass. For this reason, the systems and methods of the present disclosure can more accurately determine proximity or distance to a variety of objects with different colors and opacity/transparency characteristics, as compared with prior systems that calculate proximity or distance based on the intensity of the reflected light and have difficulty accurately determining distance for objects of different colors and levels of transparency.

The present disclosure also includes a control module in communication with the sensor module that receives the determined distance from the sensor module and controls equipment based on the determined distance. For example, the equipment may be a dispensing apparatus and the sensor module may determine a distance to a container. When the distance to the container is less than a predetermined distance, the control module may activate the dispensing apparatus. For example, the dispensing apparatus may dispense a liquid or ice into the container. After activating the dispensing apparatus, the control module may deactivate the dispensing apparatus when the distance to the container is greater than a predetermined distance. Further hysteresis may be applied to avoid spurious activation or deactivation of the dispenser at the threshold. For example, the control module may activate the dispensing apparatus when the container is less than the predetermined distance minus a hysteresis value and may deactivate the dispensing apparatus when the container is greater than the predetermined distance plus a hysteresis value.

With reference to FIG. 1, a system for object detection and equipment control 100 is shown and includes a sensor module 102, a control module 104, and equipment 106. The sensor module 102 includes a proximity detection module 108 in communication with an IR emitter 110, and an IR receiver 112. The IR emitter 110 may include a light-emitting diode (LED) that emits IR light. For example, the IR emitter 110 may emit one or more pulses of IR light in a predetermined pattern towards an object 114. The object 114 may then reflect the IR light back to the IR receiver 112. The IR receiver 112 may include an IR light detector that detects IR light reflected off of the object 114. For example, the IR receiver 112 may detect the predetermined pattern of pulses of IR light previously emitted by the IR emitter 110 and reflected off of the object 114.

The proximity detection module 108 is in communication with the IR emitter 110 and the IR receiver 112. The proximity detection module 108 determines a transmission time, corresponding to the time that the predetermined pattern of pulses of IR light was emitted from the IR emitter 110, and a detection time, corresponding to the time that the predetermined pattern of pulses of IR light was detected by the IR receiver 112. Based on the transmission time and the detection time, the proximity detection module 108 determines an elapsed time between the emission of the IR light by the IR emitter 110 and the detection of the IR light reflected off of the object 114 by the IR receiver 112. The proximity detection module 108 then determines the distance "d" from the sensor module 102 to the object 114 based on the following formula:

$$d = \tfrac{1}{2}(c \times t), \tag{1}$$

where "c" is the speed of light and "t" is the elapsed time.

The proximity detection module 108 may make multiple distance calculations over time and apply averaging and/or filtering techniques to the multiple distance calculations over a predetermined time period to determine an averaged and/or filtered distance calculation.

The control module 104 is in communication with the proximity detection module 108 of the sensor module 102 and receives the determined distance to the object 114 from the proximity detection module 108. Further, the control module 104 controls the equipment 106 based on the determined distance. For example, the equipment 106 may include a dispensing machine with a dispensing apparatus and the control module 104 may activate the dispensing apparatus when an object 114, such as a container, is determined to be within a predetermined distance of the dispensing apparatus and may deactivate the dispensing apparatus when the object 114 is determined to be greater than the predetermined distance of the dispensing apparatus. Hysteresis may be applied to avoid spurious activation or deactivation of the dispenser at or around the predetermined distance. The control module 104 may be configurable to control the equipment 106 using either a high or low signal for particular operations or controls. For example, the dispensing machine may be configured to activate the dispensing apparatus in response to a high signal and may be configured to deactivate the dispensing apparatus in response to a low signal. In such case, the control module 104 may be configured to output a high signal when the object 114 is determined to be within the predetermined distance of the dispensing apparatus and to output a low signal when the object 114 is determined to be greater than the predetermined distance of the dispensing apparatus. Alternatively, the dispensing machine may be configured to activate the dispensing apparatus in response to a low signal and may be configured to deactivate the dispensing apparatus in response to a high signal. In such case, the control module 104 may be configured to output a low signal when the object 114 is determined to be within the predetermined distance of the dispensing apparatus and to output a high signal when the object 114 is determined to be greater than the predetermined distance of the dispensing apparatus. The control module 104 can be programmed with a high/low output parameter indicating the appropriate high/low signal output behavior at the time of manufacture or installation. Additionally or alternatively, the control module 104 can be user configurable so that a user can set or change the high/low output parameter to modify the high/low signal output behavior as needed.

The dispensing machine may be, for example, a beverage, water, and/or ice dispensing machine wherein the sensor module 102 determines a distance to a cup, water bottle, pitcher, or other container and the control module 104 activates the dispensing apparatus to dispense a beverage, water, and/or ice when the cup, water bottle, pitcher, or other container is in close proximity to the dispensing apparatus. For further example, the dispensing machine may be a water or other liquid dispensing machine wherein the sensor module 102 determines a distance to a jug, bucket, or other container and the control module 104 activates the dispensing apparatus to dispense water or other liquid when the jug, bucket, or other container is in close proximity to the dispensing apparatus. For further example, the dispensing machine may be an ice machine wherein the sensor module 102 determines a distance to an ice bucket, bag, or other container and the control module 104 activates the dispensing apparatus to dispense ice when the ice bucket, bag, or other container is in close proximity to the dispensing apparatus.

For further example, the system for object detection and equipment control 100 may detect a level of a substance, such as a liquid or solid, in a container and control the equipment 106 based on the level of the substance. For example, the control module 104 may determine when a level of the liquid or solid is higher or lower than a threshold and generate an alert or notification or operate equipment, as necessary, based on the determined level.

For further example, the system for object detection and equipment control 100 may detect and count objects passing in front of the sensor module 102 and store the counted value in memory. Further, the control module 104 may determine when the counted value is greater than a threshold and generate an alert or notification or operate equipment, as necessary, based on the counted value.

In each of the above examples, the system will accurately determine the proximity of the particular object regardless of the object's appearance, e.g., light colored, dark colored, clear, opaque, etc., or the object's material composition, e.g., paper, cardboard, glass, plastic, metal (aluminum, steel, etc.), solid, or liquid.

For further example, the system for object detection and equipment control 100 may detect smoke passing in front of the sensor module 102. Further, the control module 104 may generate an alert or notification or operate equipment, as necessary, when smoke is detected.

Figure 2:
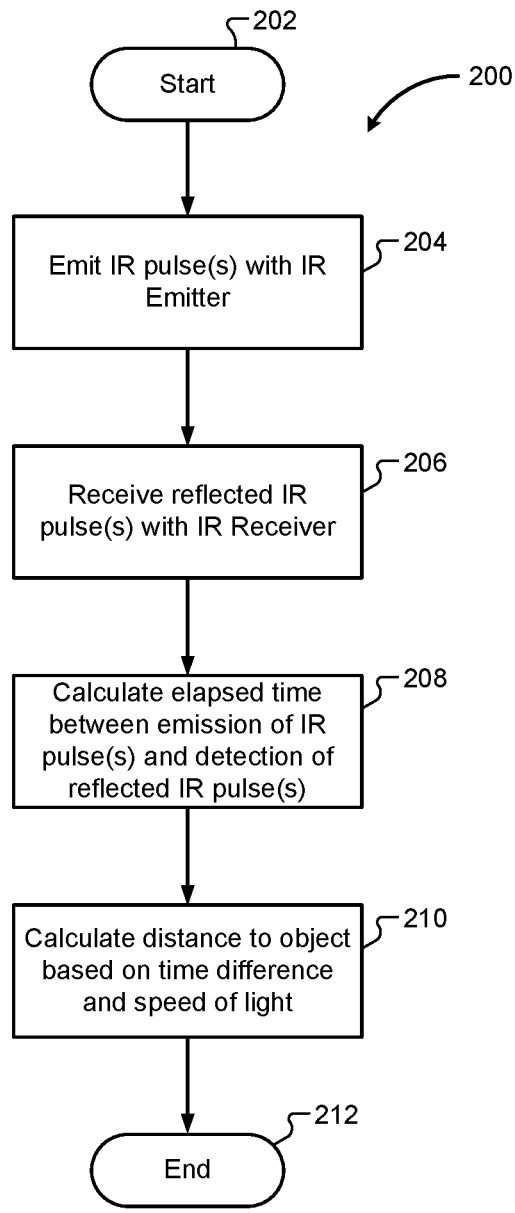
FIG. 2 is a flowchart depicting an example method for determining a distance to an object.

With reference to FIG. 2, a control algorithm 200 is shown for calculating a distance to an object. The control algorithm 200 may be performed by the sensor module 102 and starts at 202. At 204, the proximity detection module 108 of the sensor module 102 controls the IR emitter 110 to emit an IR pulse or pulses. For example, the IR emitter 110 may emit IR pulses in a predetermined pattern. The proximity detection module 108 includes a timer and stores a transmission time corresponding to when the IR emitter 110 transmitted the IR pulse(s). At 206, the IR pulse(s) are received at the IR receiver 112, after being reflected off of an object 114, and the proximity detection module 108 stores a detection time corresponding to when the IR receiver 112 detected the IR pulses reflected off of the object 114. At 208, the proximity detection module 108 calculates an elapsed time between the emission of the IR light by the IR emitter 110 and the detection of the IR light reflected off of the object 114 by the IR receiver 112. At 210, the proximity detection module 108 determines the distance to the object 114, in accordance with formula (1) above, based on the calculated elapsed time and the speed of light. At 212, the control algorithm 200 ends.

Figure 3:
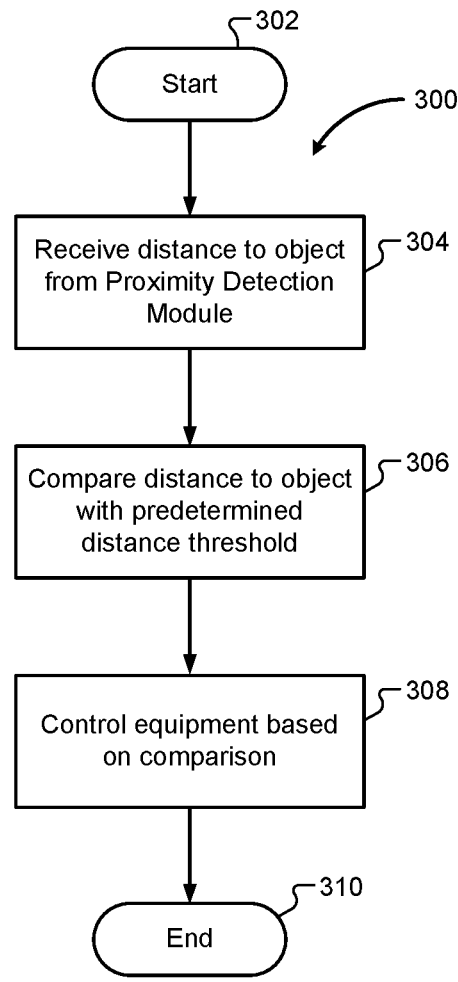
FIG. 3 is a flowchart depicting an example method for controlling equipment based on a determined distance to an object.

With reference to FIG. 3, a control algorithm 300 is shown for controlling equipment based on the determined distance to an object. The control algorithm 300 may be performed by the control module 104 and starts at 302. At 304, the control module 104 receives the determined distance to the object from the proximity detection module 108. At 306, the control module 104 compares the determined distance to the object with a predetermined distance threshold. At 308, the control module 104 controls the equipment 106 based on the comparison. For example, the control module 104 may take action to activate or deactivate the equipment 106 or a particular device or component of the equipment 106 based on whether the predetermined distance is less than or greater than the predetermined distance threshold, as appropriate. At 310, the control algorithm 300 ends.

Figure 4:
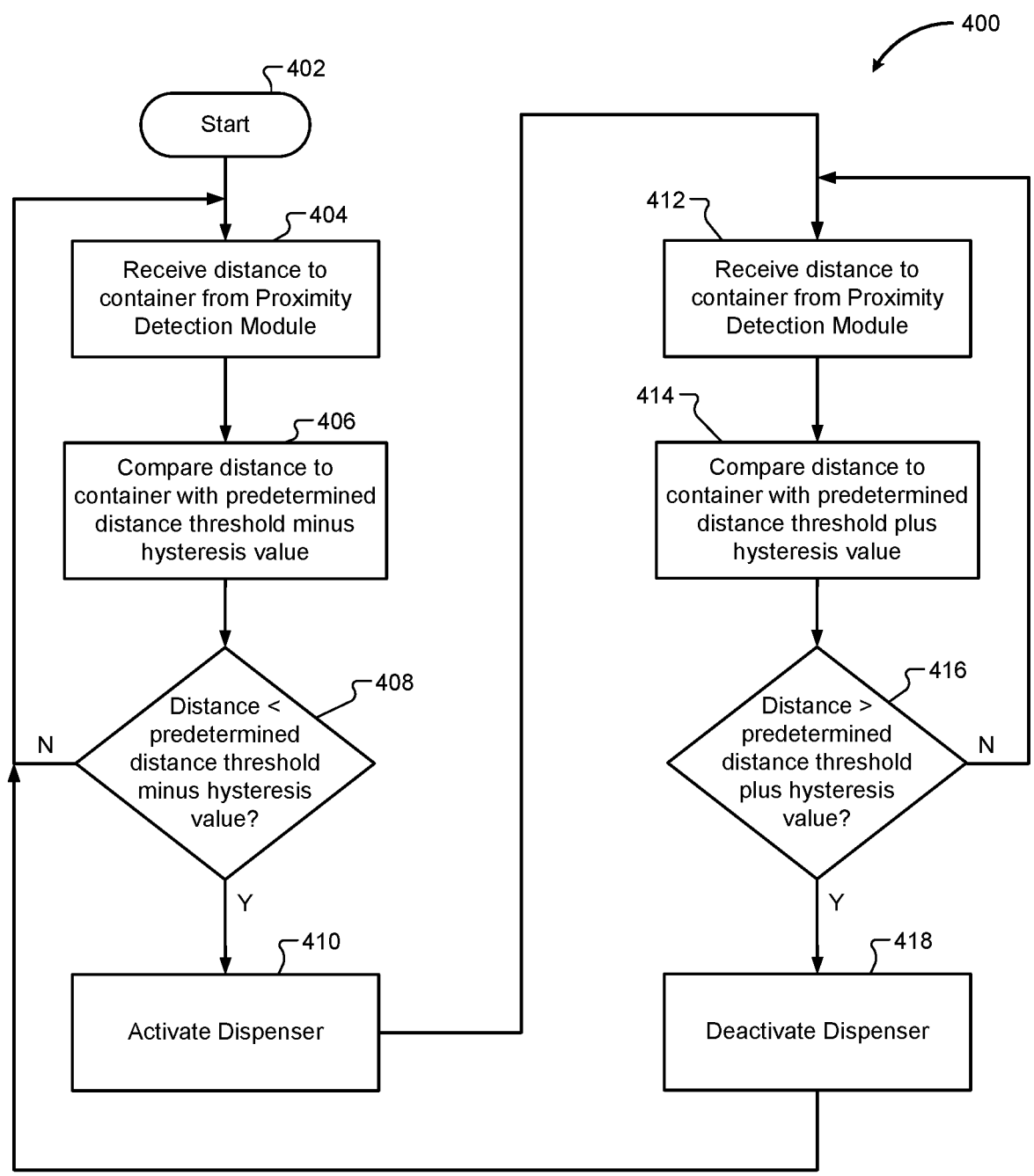
FIG. 4 is a flowchart depicting an example method for controlling a dispenser based on a determined distance to a container.

With reference to FIG. 4, a control algorithm 400 is shown for controlling a dispenser, such as a liquid or ice dispenser, based on the determined distance to a container.

Figure 6A:
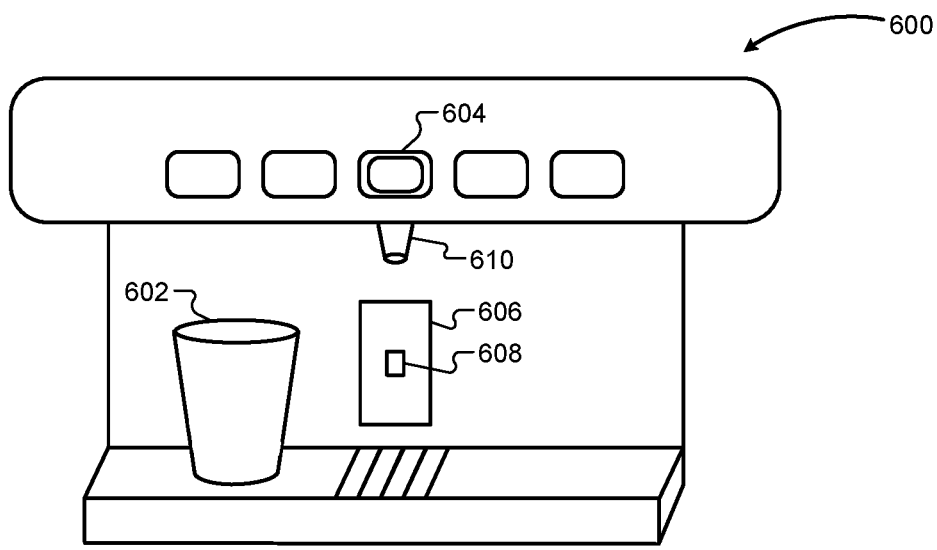
FIG. 6A is a perspective view of a dispenser and a container.
Figure 6B:
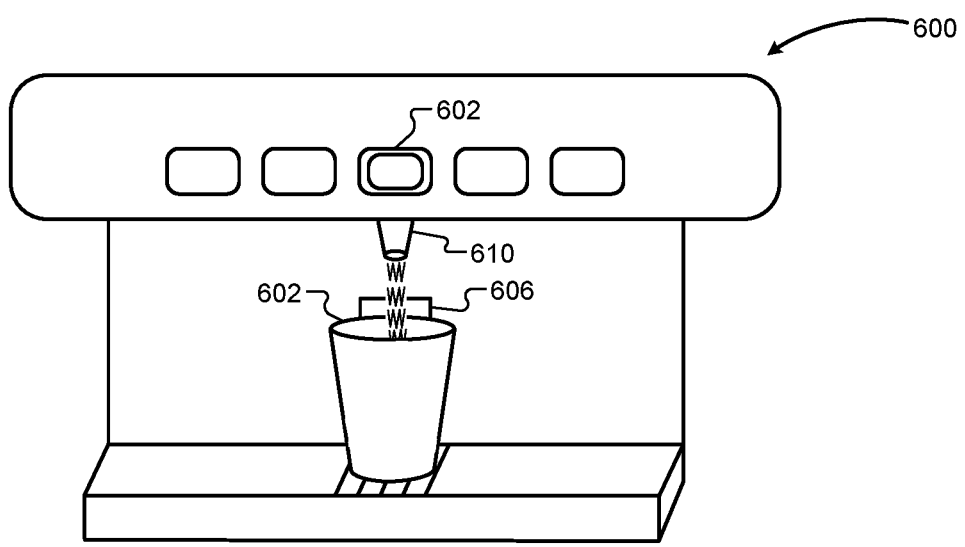
FIG. 6B is a perspective view of a dispenser dispensing into a container.

For example, the dispenser may be a beverage and ice dispenser that dispenses water, soda, tea, and/or ice, based on a selection of a user and based on a determined distance to a cup. (As discussed below, a beverage and ice dispenser is shown in FIGS. 6A and 6B with a cup.) The control algorithm 400 may be performed by the control module 104 and starts at 402. At 404, the control module 104 receives the distance to the container from the proximity detection module 108. At 406, the control module 104 compares the determined distance to the container with a predetermined distance threshold minus a hysteresis value. The hysteresis value may be selected to avoid spurious activation or deactivation of the dispenser at or near the predetermined distance. The predetermined distance threshold may be, for example, 50 millimeters (or 2 inches). The hysteresis value may be, for example, a predetermined percentage, such as 5%, of the predetermined distance threshold. For example, if the predetermined distance threshold is 50 millimeters, the hysteresis value may be 2.5 millimeters. The predetermined distance threshold and the hysteresis value may be stored in memory by the control module 104. Both the predetermined distance threshold and the hysteresis value may be user configurable. At 408, the control module 104 determines whether the distance to the container is less than the predetermined distance threshold minus the hysteresis value. When the distance to the container is not less than the predetermined distance threshold minus the hysteresis value, the control module 104 loops back to 404. In this way, the control module 104 will continue to loop back and execute steps 404, 406, and 408 until the determined distance is less than the predetermined threshold minus the hysteresis value. At 408, when the distance to the container is less than the predetermined threshold minus the hysteresis value, the control module 104 proceeds to 410 and activates the dispenser. For example, at 410 the control module 104 may activate the beverage and ice dispenser and dispense a selected beverage or ice into a cup placed in front of the sensor module 102 and below the dispenser. (As discussed below, a beverage and ice dispenser is shown dispensing a beverage into a cup in FIG. 6B).

At 410, once the control module 104 has activated the dispenser, the control module 104 proceeds to 412 and receives the distance to the container from the proximity detection module 108. At 414, the control module 104 compares the determined distance to the container with a predetermined distance threshold plus the hysteresis value. Again, the hysteresis value may be selected to avoid spurious deactivation of the dispenser at or near the predetermined distance. The hysteresis value used at 414 for deactivation of the dispenser may be the same hysteresis value used at 406 for activation of the dispenser. For example, if the predetermined distance threshold is 50 millimeters, the hysteresis value may be 2.5 millimeters. Alternatively, different hysteresis values may be used for activation and deactivation of the dispenser. At 416, the control module 104 determines whether the distance to the container is greater than the predetermined distance threshold plus the hysteresis value. When the distance to the container is not greater than the predetermined distance threshold plus the hysteresis value, the control module 104 loops back to 412. In this way, the control module 104 will continue to loop back and execute steps 412, 414, and 416 until the determined distance is greater than the predetermined threshold plus the hysteresis value. At 416, when the distance to the container is greater than the predetermined threshold plus the hysteresis value, the control module 104 proceeds to 418 and deactivates the dispenser. For example, at 418 the control module 104 may deactivate the beverage and ice dispenser. At 418, once the control module 104 has deactivated the dispenser, the control module 104 loops back to step 404 and starts the control algorithm 400 anew.

As can be appreciated, the sensor module 102 continues to sense the distance to the closest object reflecting IR light back to the sensor module 102. The closet object may be a container held by a user in front of the sensor module, as discussed above with respect to FIG. 4. The closest object could also be a user standing in front of the sensor module 102, but that has not yet placed a cup into the dispenser and in front of the sensor module 102. The closest object could also be a wall that is opposite to the sensor module 102. In such case, in the context of the beverage and ice dispenser example, the determined distance will be larger than the predetermined distance threshold, for example 50 millimeters (or 2 inches). Further, in such case, the control module 104 will continue to execute steps 404, 406, and 408 in a loop until an object is determined to be at a distance from the sensor module 102 that is less than the predetermined distance threshold minus the hysteresis value.

In addition, the control module 104 may be configured to take appropriate action in the event an object is located in front of the sensor module 102 for a prolonged period of time. For example, if the sensor module 102 is splashed with liquid or a cup is stuck in front of the dispenser for a predetermined time-off period, the control module 104 may deactivate the dispenser. The predetermined time-off period, for example, could be set at the time of manufacture and may be between one and ninety-nine seconds. Other time-off periods could also be used. The predetermined time-off period can be programmed or set in the control module 104 at the time of manufacture or installation. Additionally or alternatively, the control module 104 can be user configurable so that a user can set or change the predetermined time-off period as needed. Once the predetermined time-off period has been exceeded, the control module 104 may deactivate the dispenser, for example, until an actual off condition is sensed, at which time the control module 104 may reset. For example, if the control module 104 senses that a distance to an object 114, such as a cup or splash of liquid, is less than a predetermined distance threshold and remains there for more than the predetermined time-off period, the control module 104 may deactivate the dispenser. In such case, the dispenser may remain deactivated until the control module 104 senses that the object 114, such as the cup or splash of liquid, has been removed and is no longer closer than the predetermined distance threshold from the sensor module 102. At that point, the control module 104 may reset and return to normal operation.

Additionally or alternatively, the control module 104 may be configured to take appropriate action in the event an object is detected as being too close to the sensor module 102. For example, if the sensor module 102 is splashed with liquid or an object is stuck very close to the sensor module, the control module 104 may deactivate the dispenser. For example, the control module 104 may be configured with a minimum distance parameter. The control module 104 may then compare the detected distance to the object 114 with the minimum distance parameter. The minimum distance parameter, for example, could be set at the time of manufacture and may be between one and ninety-nine millimeters. Other minimum distance parameters, however, could also be used. The minimum distance parameter can be programmed or set in the control module 104 at the time of manufacture or installation. Additionally or alternatively, the control module 104 can be user configurable so that a user can set or change the minimum distance parameter as needed. When the detected distance to the object 114 is less than the minimum distance parameter, the control module 104 may immediately deactivate the dispenser, for example, until the object 114 is removed and an actual off condition is sensed, at which time the control module 104 may reset. For example, if the control module 104 senses that a distance to an object 114, such as a cup or splash of liquid, is less than the minimum distance parameter, the control module 104 may deactivate the dispenser immediately. In such case, the dispenser may remain deactivated until the control module 104 senses that the object 114, such as the cup or splash of liquid, has been removed and is no longer closer than minimum distance parameter and no longer closer than the predetermined distance threshold from the sensor module 102. At that point, the control module 104 may reset and return to normal operation.

Figure 5A:
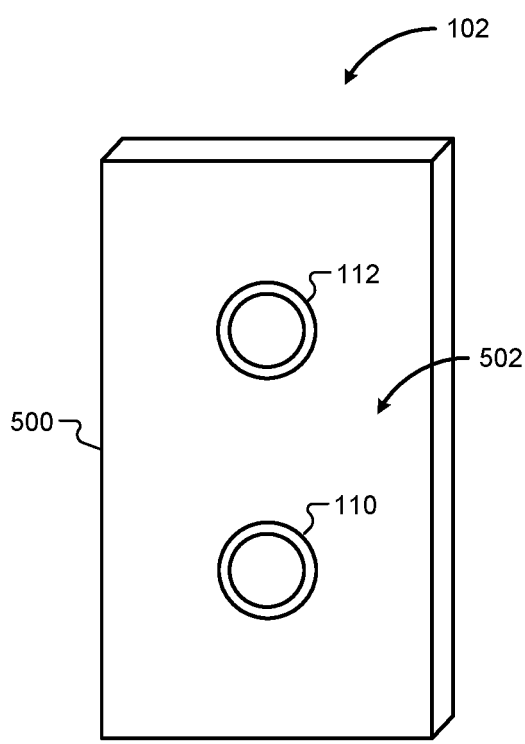
FIG. 5A is a front view of a sensor module and sensor module casing.
Figure 5B:
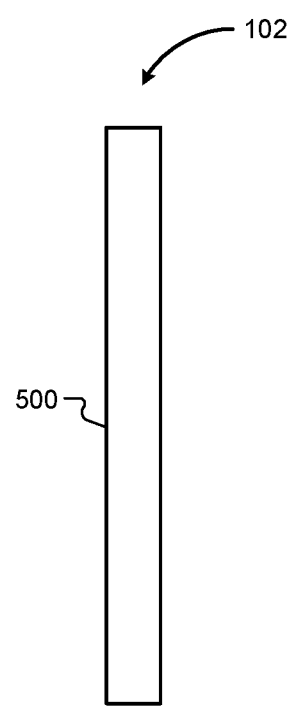
FIG. 5B is a side view of a sensor module and sensor module casing.

With reference to FIGS. 5A and 5B, the sensor module 102 is shown in a sensor module casing 500. FIG. 5A shows a front view of the sensor module casing 500. FIG. 5B shows a side view of the sensor module casing 500. As shown in FIG. 5A, the outer face 502 of the sensor module casing 500 includes apertures for the IR emitter 110 and the IR receiver 112. The outer faces of the IR emitter 110 and IR receiver 112 may be flush with the outer face 502 of the sensor module casing 500. Alternatively, the outer faces of the IR emitter 110 and IR receiver 112 may be slightly sunken below the outer face 502 of the sensor module casing 500. The sensor module 102 and sensor module casing 500 may be, for example, a VL6180X proximity and ambient light sensing (ALS) module available from STMicroelectronics.

The sensor module casing 500 may include pins and solder pads for attachment of the sensor module casing 500 to a printed circuit board (PCB). The sensor module casing 500 may be appropriately sized as needed for particular proximity sensing applications. For example, for beverage and ice dispensing applications, the sensor module casing 500 may be approximately 5.0 millimeters by 3.0 millimeters by 1.0 millimeters.

With reference to FIGS. 6A and 6B, a beverage and ice dispenser 600 is shown with a cup 602. As shown, a particular beverage selection button 604 has been selected. As discussed in further detail below, the sensor module 102 and sensor module casing 500 are located in a component housing 606 behind a protective overlay 608. As further discussed below, the IR emitter 110 and IR receiver 112 can emit and receive IR light through the protective overlay 608 so that the sensor module 102 can perform the functionality described herein.

As shown in FIG. 6A, the cup 602 is located to the side of the protective overlay 608 and outside of the range of the IR emitter 110 and IR receiver 112. In such case, the sensor module 102 may be sensing the distance from the sensor module 102 to the closest object in front of the beverage and ice dispenser 600, which may be a user or an opposite wall. As shown in FIG. 6B, the cup 602 has been moved to directly in front of the protective overlay 608 so that the sensor module senses a distance from the sensor module 102 to the cup 602. In such case, because the distance from the sensor module 102 to the cup 602 is less than the predetermined distance threshold, the dispenser has been activated and a beverage is dispensed through a dispenser nozzle 610 into the cup 602.

With reference to FIGS. 7A and 7B, cross sections of a configuration of the component housing 606, protective overlay 608, and sensor module casing 500 are shown. In particular, in this configuration the sensor module casing 500 is attached to a primary PCB 700. The primary PCB 700 may include modules and circuitry for carrying out the functionality described herein. For example, the primary PCB 700 may include the control module 104. The primary PCB 700 may also include memory, including volatile and/or non-volatile memory, for storing code, thresholds, configuration parameters, and other values used for carrying out the functionality described herein.

The component housing 606 includes a locator ridge 702 (also shown in FIG. 8A) and an aperture 704 for the sensor module casing 500. The component housing 606 can be produced using high-definition stereo lithography (HDSL). For example, HDSL can be used to create a prototype and/or soft mold cast for producing prototypes of the component housing 606 for testing and manufacturing process development. For example, a high-impact urethane material, such as an AFP3100FR polymer, can be used for the component housing 606. Additionally, the component housing 606 can be produced using injection molding. For example, Polylac® ABS PA-765 available from Chi Mei Corporation can be used for the injection molding of the component housing 606.

The primary PCB 700 is attached to an inner face 706 of the component housing 606 such that the sensor module casing 500 is located within the aperture 704 of the component housing 606. In the configuration of FIGS. 7A and 7B, a thickness of the component housing 606 is configured to match a thickness of the sensor module casing 500. For example, if the sensor module casing 500 is 1 millimeter thick, a thickness of the component housing 606, at least within the area around the aperture 704 inside the locator ridge 702, is configured to likewise be 1 millimeter thick. In this way, when the primary PCB 700 is attached to the inner face 706 of the component housing 606 and the sensor module casing 500 is located within the aperture 704, an outer face 502 of the sensor module casing 500 is flush with an outer face 708 of the component housing 606.

As shown in FIG. 7B, the protective overlay 608 is installed on the component housing 606 within the locator ridge 702 and serves to protect the sensor module 102 and primary PCB 700 from environmental materials, such as liquids, dirt, and dust, as well as tampering from users. The protective overlay 608 may be a hard coated polyester film, consisting of a base polyester and an embossable, texturable, chemically bonded UV-cured hard surface coating. For example, the protective overlay 608 may be made from Autoflex® EB (EBA187L) available from MacDermid Autotype Limited. The portion of the protective overlay 608 located over the sensor module casing 500 may be screened with transparent dark black ink to ensure smoothness and compatibility with the wavelength specification of the sensor module 102. The border of the protective overlay 608 may be printed with opaque black to reduce interface or crosstalk with the sensor module 102. An inner face of the protective overlay 608 may include an adhesive layer to attach the protective overlay 608 to the outer face 708 of the component housing 606 and the outer face 502 of the sensor module casing 500. For example, an adhesive transfer tape, such as 3M™ Adhesive Transfer Tap Double Linered 7955MP available from 3M, may be used.

Because the outer face 502 of the sensor module casing 500 is flush with the outer face 708 of the component housing 606, when the protective overlay 608 is installed within the locator ridge 702 the protective overlay 608 is flat against the outer face 502 of the sensor module casing 500 so that there is no air gap between the protective overlay 608 and the outer face 502 of the sensor module casing 500.

Although FIG. 7B shows a small gap between the protective overlay 608 and the outer face 502 of the sensor module casing 500 for purposes of illustration, it is understood that the protective overlay 608 can be installed flat against the outer face 502 of the sensor module casing 500 so that there is no air gap. Alternatively, the outer face 502 of sensor module casing 500 can be very close to flush with the outer face 708 of the component housing 606 so that when the protective overlay 608 is installed within the locator ridge 702 there is a minimal air gap between the protective overlay 608 and the outer face 502 of the sensor module casing 500. Alternatively, the outer face 502 of the sensor module casing 500 may be flush with the outer face 708 of the component housing 606 and the protective overlay 608 may be installed slightly off of the outer face 502 of the sensor module casing 500 and outer face 708 of the component housing 606 so that there is a minimal air gap between the protective overlay 608 and the outer face 502 of the sensor module casing 500.

Eliminating or minimizing the air gap between the protective overlay 608 and the outer face 502 of the sensor module casing 500 will eliminate or reduce the amount of interference or cross-talk caused by IR light reflecting off of the inner surface of the protective overlay 608 and back to the IR receiver 112. For example, if there is a large air gap between the protective overlay 608 and the outer face 502 of the sensor module casing 500, the sensor module 102 may, in some instances, sense the distance from the sensor module 102 to the protective overlay 608 instead of the distance to an object 114. By eliminating or minimizing the air gap between the protective overlay 608 and the outer face 502 of the sensor module casing 500, the possibility of such interference or cross-talk can be eliminated or reduced.

Figure 8A:
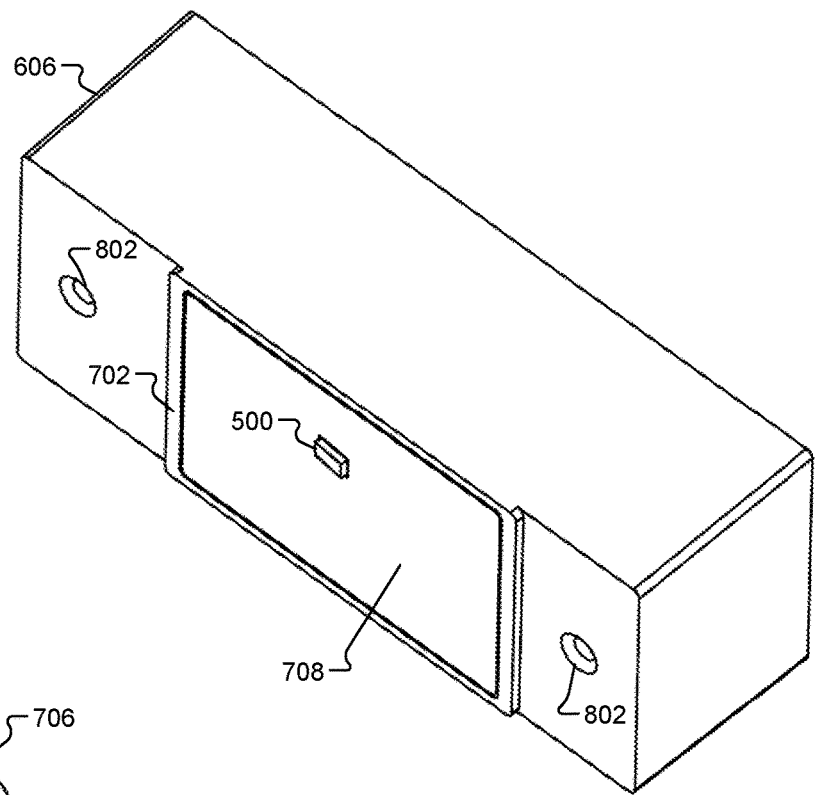
FIG. 8A is a perspective view of a housing and sensor module casing.
Figure 8B:
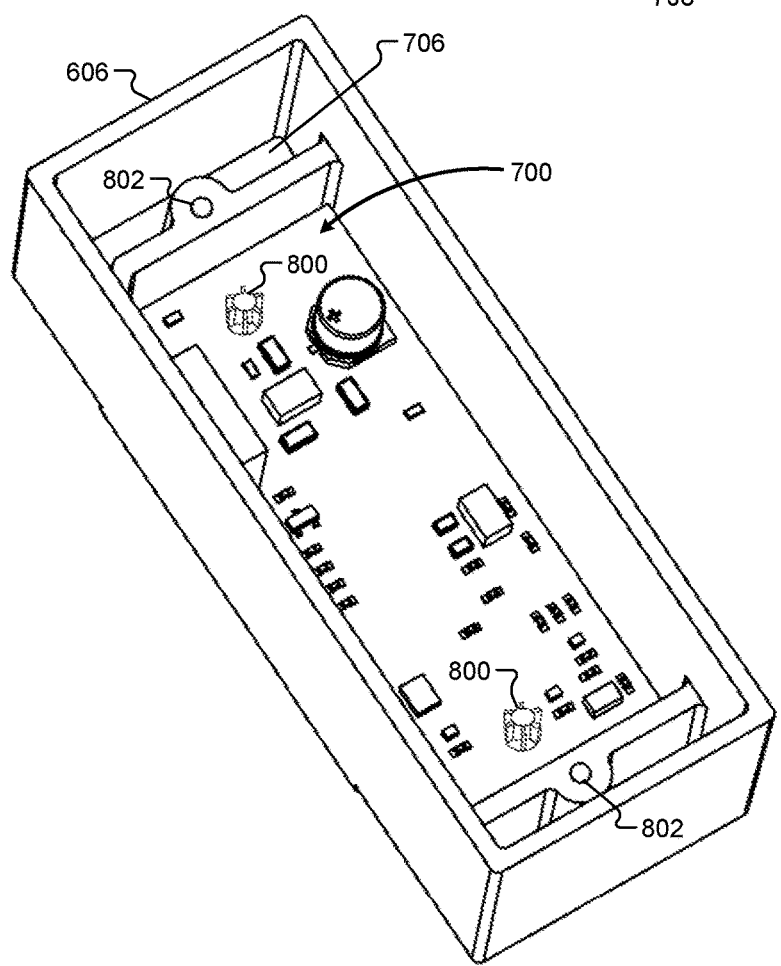
FIG. 8B is a perspective view of a housing and printed circuit board.

With reference to FIGS. 8A and 8B, perspective views of the configuration of FIGS. 7A and 7B are shown. Specifically, with reference to FIG. 8A, the outer face 708 of the component housing 606 is shown with the sensor module casing 500 located in the middle of the area inside the locator ridge 702. With reference to FIG. 8B, the component housing 606 is shown with the primary PCB 700 installed against the inner face 706 of the component housing 606. As shown in FIG. 8B, the primary PCB 700 may be attached to the inner face 706 of the component housing 606 with retention bosses 800. As described in further detail below, the primary PCB 700 may also be attached to the inner face 706 of the component housing 606 with adhesive.

Figure 9A:
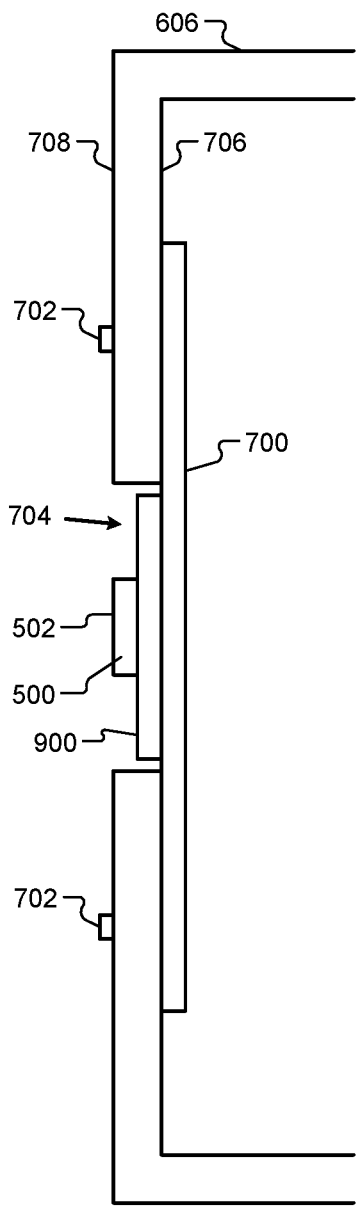
FIG. 9A is a cross section of a housing and sensor module casing.
Figure 9B:
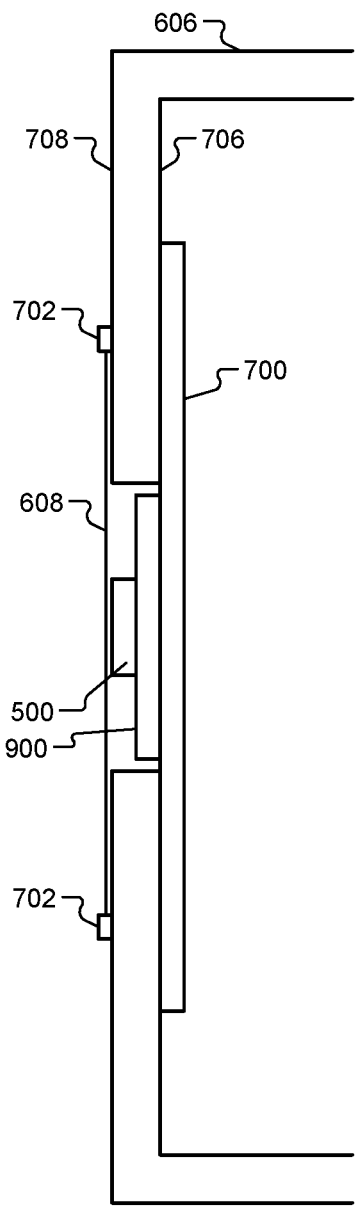
FIG. 9B is a cross section of a housing and sensor module casing.

With reference to FIGS. 9A and 9B, cross sections of another configuration of the component housing 606, protective overlay 608, and sensor module casing 500 are shown. In this configuration, the sensor module casing 500 is attached to a secondary PCB 900. The secondary PCB 900 is attached to the primary PCB 700, creating a stack of components with the sensor module casing 500 mounted on the secondary PCB 900 and the secondary PCB mounted on the primary PCB 700. The primary PCB 700 and/or the secondary PCB 900 may include modules and circuitry for carrying out the functionality described herein. For example, the primary PCB 700 and/or the secondary PCB 900 may include the control module 104. The primary PCB 700 or the secondary PCB 900 may also include memory, including volatile and/or non-volatile memory, for storing code, thresholds, configuration parameters, and other values used for carrying out the functionality described herein.

The secondary PCB 900 can be mounted onto the primary PCB 700 by soldering using an automated surface-mount technology assembly system. Further, the secondary PCB 900 can be appropriately sized and configured for utilization of a quad flat package tray during assembly.

The component housing 606 includes a locator ridge 702 and an aperture 704 for the sensor module casing 500 and secondary PCB 900. The aperture 704 is generally centered with the primary PCB 700 and is sized so that the entire secondary PCB 900 can fit within the aperture 704 when the primary PCB 700 is installed against the inner face 706 of the component housing 606. In this way, the location of the sensor module casing 500 can, if necessary, be installed at different locations on the secondary PCB 900, off-centered from the aperture 704.

The primary PCB 700 is attached to the inner face 706 of the component housing 606 such that the sensor module casing 500 and secondary PCB 900 are both located within the aperture 704 of the component housing 606. In the configuration of FIGS. 9A and 9B, a thickness of the component housing 606 is configured to match a thickness of the sensor module casing 500 together with the secondary PCB 900. For example, if the sensor module casing 500 is 1 millimeter thick and the secondary PCB 900 is 1.6 millimeters thick, a thickness of the component housing 606, at least within the area around the aperture 704 inside the locator ridge 702, is configured to likewise be 2.6 millimeters thick. In this way, when the primary PCB 700 is attached to the inner face 706 of the component housing 606 and the sensor module casing 500 and secondary PCB 900 are located within the aperture 704, an outer face 502 of the sensor module casing 500 is flush with an outer face 708 of the component housing 606.

As shown in FIG. 9B, the protective overlay 608 is installed on the component housing 606 within the locator ridge 702. As discussed above, the protective overlay 608 serves to protect the sensor module 102, secondary PCB 900, and the primary PCB 700 from environmental materials, such as liquids, dirt, and dust, as well as tampering from users. Because the outer face 502 of the sensor module casing 500 is flush with the outer face 708 of the component housing 606, when the protective overlay 608 is installed within the locator ridge 702 the protective overlay 608 is flat against the outer face 502 of the sensor module casing 500 so that there is no air gap between the protective overlay 608 and the outer face 502 of the sensor module casing 500. Although FIG. 9B shows a small gap between the protective overlay 608 and the outer face 502 of the sensor module casing 500 for purposes of illustration, it is understood that the protective overlay 608 can be installed flat against the outer face 502 of the sensor module casing 500 so that there is no air gap. Alternatively, the outer face 502 of sensor module casing 500 can be very close to flush with the outer face 708 of the component housing 606 so that when the protective overlay 608 is installed within the locator ridge 702 there is a minimal air gap between the protective overlay 608 and the outer face 502 of the sensor module casing 500. Alternatively, the outer face 502 of the sensor module casing 500 may be flush with the outer face 708 of the component housing 606 and the protective overlay 608 may be installed slightly off of the outer face 502 of the sensor module casing 500 and outer face 708 of the component housing 606 so that there is a minimal air gap between the protective overlay 608 and the outer face 502 of the sensor module casing 500.

As discussed above, eliminating or minimizing the air gap between the protective overlay 608 and the outer face 502 of the sensor module casing 500 will eliminate or reduce the amount of interference or cross-talk caused by IR light reflecting off of the inner surface of the protective overlay 608 and back to the IR receiver 112.

The primary PCB 700 may be attached to an inner face 706 of the component housing 606 with an adhesive. For example, with reference to FIG. 10, a front view of an adhesive gasket 1000 along with the primary PCB 700, the secondary PCB 900, and the sensor module casing 500 is shown. Specifically, adhesive is located on both the front and the back of the adhesive gasket 1000. The adhesive gasket includes an aperture 1002 that is slightly larger than the secondary PCB 900 such that when the adhesive gasket 1000 is placed on the primary PCB 700 (as shown by arrows 1004), the secondary PCB 900 and sensor module casing 500 are located within the aperture 1002 of the adhesive gasket 1000. In this way, the adhesive gasket 1000 may be placed on the primary PCB 700 and to adhere the primary PCB 700 to the inner face 706 of the component housing 606 (shown in FIG. 9B). Once assembled in the component housing 606, the adhesive gasket 1000 serves as a gasket during potting of the assembly so that potting material does not leak between the primary PCB 700 and the secondary PCB and does not reach the aperture 704 of the component housing 606 or the sensor module casing 500.

Figure 10:
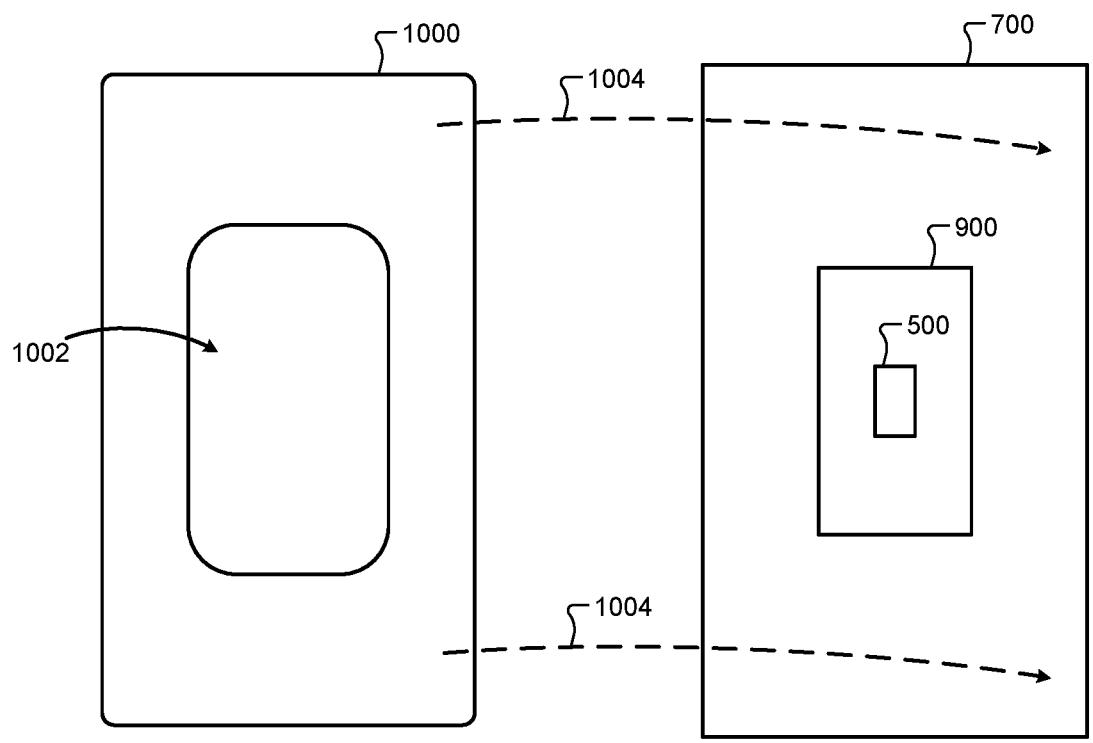
FIG. 10 is a perspective view of a primary printed circuit board, a secondary printed circuit board, a sensor module casing, and an adhesive gasket.
Figure 11A:
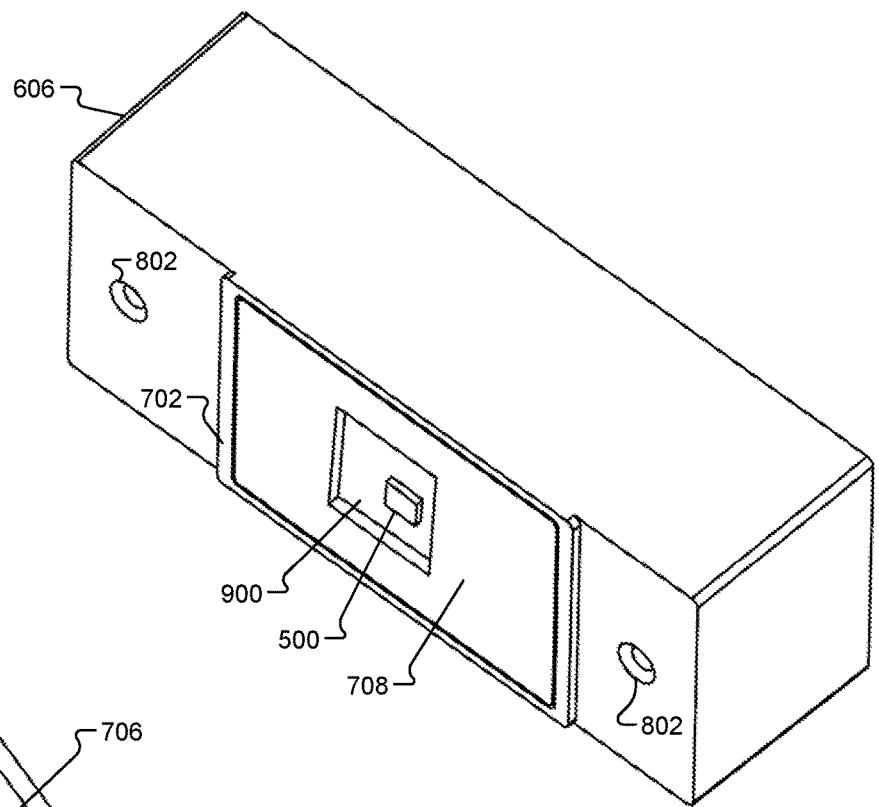
FIG. 11A is a perspective view of a housing and sensor module casing.
Figure 11B:
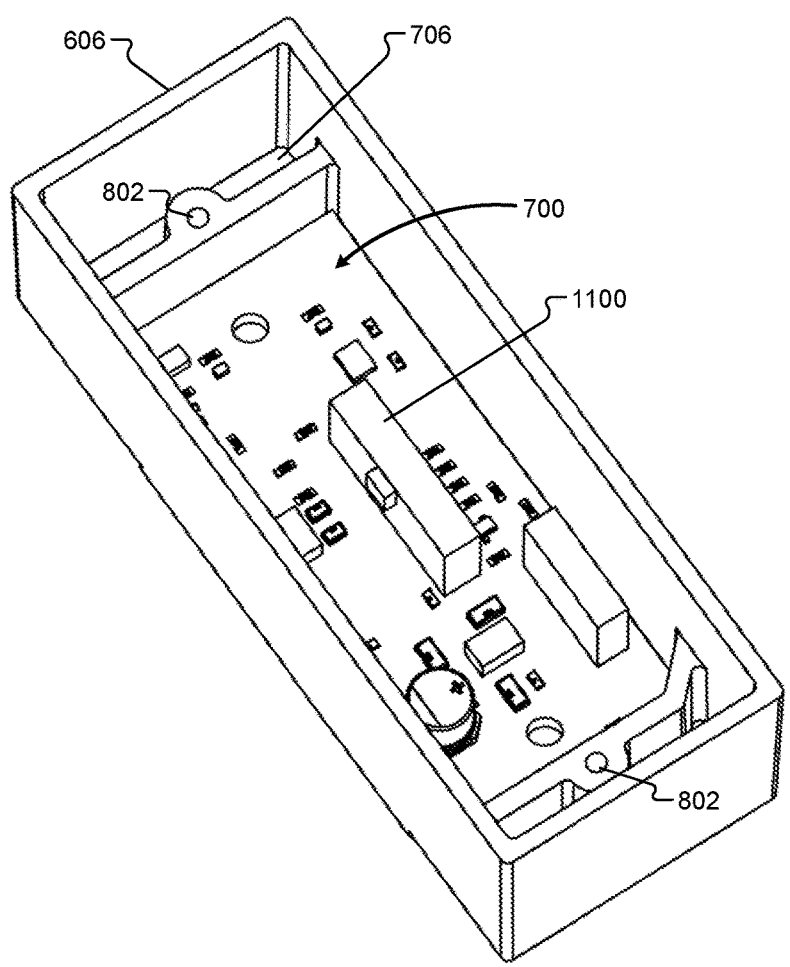
FIG. 11B is a perspective view of a housing and printed circuit board.

With reference to FIGS. 11A and 11B, perspective views of the configuration of FIGS. 9A, 9B, and 10 are shown. Specifically, with reference to FIG. 11A, the outer face 708 of the component housing 606 is shown with the sensor module casing 500 and secondary PCB 900 located in the middle of the area inside the locator ridge 702. With reference to FIG. 11B, the component housing 606 is shown with the primary PCB 700 installed against the inner face 706 of the component housing 606. As shown in FIG. 11B, because the primary PCB 700 is attached to the inner face 706 of the component housing 606 with the adhesive gasket 1000 described above, the retention bosses 800 (shown in FIG. 8B) are not needed.

As shown in FIG. 11B, the primary PCB 700 may include a connector 1100 with an interface for connecting the primary PCB 700 to other modules or components of the system to allow communication between the primary PCB 700 and other modules or components of the system. During assembly, the connector 1100 may be used as a handle so that an assembler can hold the connector 1100 while locating the primary PCB 700 in the correct location within the component housing 606 so that the secondary PCB 900 and sensor module casing 500 are located within the aperture 704 (shown in FIG. 9A) of the component housing 606.

The primary PCB 700 may include a communication port to allow communication with the control module 104 and/or the sensor module 102. For example, at the time of manufacture or at the time of installation or configuration in the field, the control module 104 and/or the sensor module 102 may be programmed with application specific parameters, thresholds, or calibration values which can be stored by the control module 104 and/or the sensor module 102 in an accessible non-volatile memory. For example, the predetermined distance threshold, and hysteresis value(s) for activating and deactivating a dispenser of a dispensing apparatus may vary from dispensing apparatus to dispensing apparatus. In addition, the time-off period, minimum distance parameter, and high/low output parameter may vary from dispensing apparatus to dispensing apparatus and application to application. At the time of manufacture, installation, or configuration in the field, the control module 104 and/or sensor module 102 may be programmed with the specific distance threshold, hysteresis value(s), time-off period, minimum distance parameter, and high/low output parameter to be used for a particular dispensing apparatus. Likewise, at the time of installation or configuration, the sensor module 102 and/or control module 104 may be tested and calibrated in the field based on testing at known distances. In such case, the control module 104 and/or sensor module 102 may be programmed with calibration values to adjust operation of the control module 104 and/or sensor module 102 based on actual testing in the field. Additionally, the control module 104 and/or sensor module 102 may be programmed with information for any unique protocols necessary for communication with other components or devices in the system.

As shown in FIGS. 8A, 8B, 11A, and 11B, the component housing 606 includes mounting holes 802, which are threaded for attaching the component housing 606 to particular apparatuses, including, for example, dispensing apparatuses. The mounting holes 802 may be threaded all the way through to allow for mounting of the component housing 606 with screws or bolts from either the front side or back side of the component housing 606.

Further, the component housing 606 can be appropriately sized for retrofit applications to replace existing housings with existing proximity sensors. For example, existing dispensing apparatuses can be retrofitted with a component housing 606, including the sensor module 102 utilizing the systems and methods for proximity detection described herein.

The control module 104 and sensor module 102 may be connected to a power supply and may be appropriately configured for operation with either AC or DC power.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
    a housing having an inner face, an outer face, and an aperture that extends through the housing from the inner face to the outer face, the inner face and the outer face being on opposite sides of the housing and parallel to each other;
    a printed circuit board;
    a sensor module mounted to the printed circuit board and having
        an infrared emitter that emits a pulse of infrared light,
        an infrared receiver that detects the pulse of infrared light emitted by the infrared emitter after the pulse of infrared light reflects off of a container, and
        a proximity detection module configured to determine (i) a transmission time when the infrared emitter emits the pulse of infrared light, (ii) a detection time when the infrared receiver detects the pulse of infrared light, (iii) an elapsed time between the transmission time and the detection time, and (iv) a distance to the container based on the elapsed time; and
    a control module for a dispenser, the control module configured to receive the determined distance from the proximity detection module and to activate the dispenser when the determined distance to the container is less than a predetermined threshold;
    wherein the printed circuit board is directly mounted to the inner face of the housing such that the infrared emitter and the infrared receiver are each held at a location within the aperture of the housing by the printed circuit board mounted to the inner face of the housing.

2. The system of claim 1, wherein the control module is further configured to deactivate the dispenser when the determined distance to the container is greater than the predetermined threshold.

3. The system of claim 1, wherein the control module is further configured to deactivate the dispenser after determining that a predetermined time period from activation of the dispenser has elapsed.

4. The system of claim 1, wherein the dispenser dispenses at least one of a liquid and ice into the container when activated.

5. The system of claim 1, wherein the sensor module includes:
    a casing that encases the infrared emitter, the infrared receiver, and the proximity detection module, wherein the casing is mounted to the printed circuit board.

6. The system of claim 5, wherein an outer face of the casing is flush with the outer face of the housing, the system further comprising a protective overlay positioned over the outer face of the casing and at least a portion of the outer face of the housing.

7. The system of claim 6, wherein there is no air gap between the protective overlay and the outer face of the casing.

8. The system of claim 6, wherein an inner face of the protective overlay includes an adhesive layer that attaches the inner face of the protective overlay to the outer face of the casing and the outer face of the housing.

9. The system of claim 6, wherein an outer face of the protective overlay is screened with a transparent dark black ink.

10. The system of claim 6, wherein the housing includes a locator ridge and the protective overlay is installed within the locator ridge of the housing.

11. A method comprising:
    emitting, with an infrared emitter of a sensor module, a pulse of infrared light, the sensor module being mounted to a printed circuit board and the printed circuit board being mounted to a housing having an inner face, an outer face, and an aperture that extends through the housing from the inner face to the outer face, the inner face and the outer face being on opposite sides of the housing and parallel to each other;
    detecting, with an infrared receiver of the sensor module, the pulse of infrared light emitted by the infrared emitter after the pulse of infrared light reflects off of a container;
    determining, with a proximity detection module of the sensor module, a transmission time when the infrared emitter emits the pulse of infrared light;
    determining, with the proximity detection module, a detection time when the infrared receiver detects the pulse of infrared light;
    determining, with the proximity detection module, an elapsed time between the transmission time and the detection time;
    determining, with the proximity detection module, a distance to the container based on the elapsed time;
    receiving, with a control module for a dispenser, the determined distance from the proximity detection module; and
    activating, with the control module, the dispenser when the determined distance to the container is less than a predetermined threshold;
    wherein the printed circuit board is directly mounted to the inner face of the housing such that the infrared emitter and the infrared receiver are each held at a location within the aperture of the housing by the printed circuit board mounted to the inner face of the housing.

12. The method of claim 11, further comprising deactivating, with the control module, the dispenser when the determined distance to the container is greater than the predetermined threshold.

13. The method of claim 11, further comprising deactivating, with the control module, the dispenser after determining that a predetermined time period from activation of the dispenser has elapsed.

14. The method of claim 11, wherein the dispenser dispenses at least one of a liquid and ice into the container when activated.

15. The method of claim 11, wherein the sensor module includes a casing that encases the infrared emitter, the infrared receiver, and the proximity detection module and wherein the casing is mounted to the printed circuit board.

16. The method of claim 15, wherein an outer face of the casing is flush with the outer face of the housing and a protective overlay is positioned over the outer face of the casing and at least a portion of the outer face of the housing.

17. The method of claim 16, wherein there is no air gap between the protective overlay and the outer face of the casing.

18. The method of claim 16, wherein an inner face of the protective overlay includes an adhesive layer that attaches the inner face of the protective overlay to the outer face of the casing and the outer face of the housing.

19. The method of claim 16, wherein an outer face of the protective overlay is screened with a transparent dark black ink.

20. The method of claim 16, wherein the housing includes a locator ridge and the protective overlay is installed within the locator ridge of the housing.

\* \* \* \* \*